Feb. 8, 1927.
A. J. NEYLON
WAFFLE IRON
Filed Jan. 28, 1925
1,617,026
2 Sheets-Sheet 1
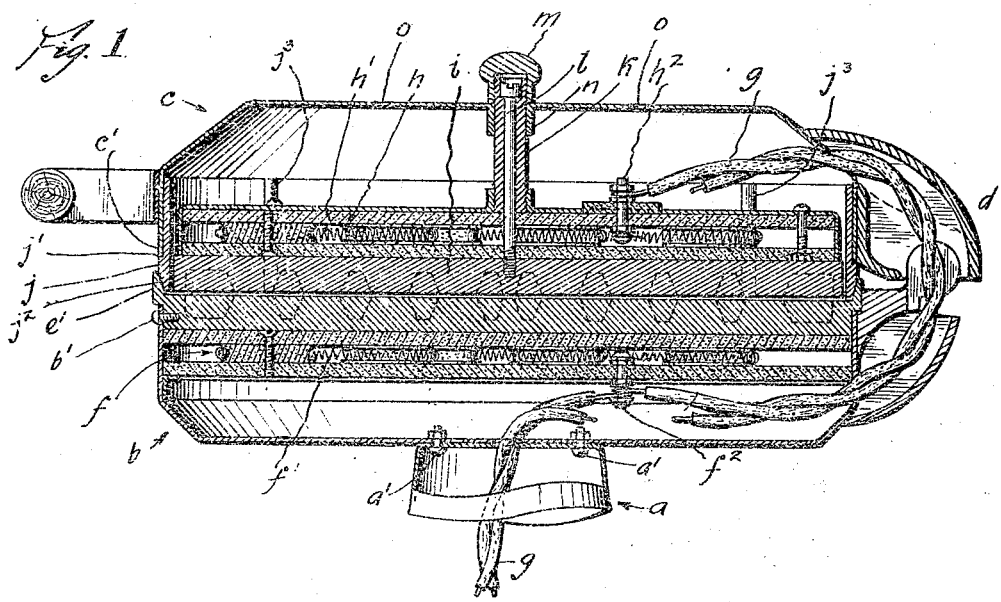
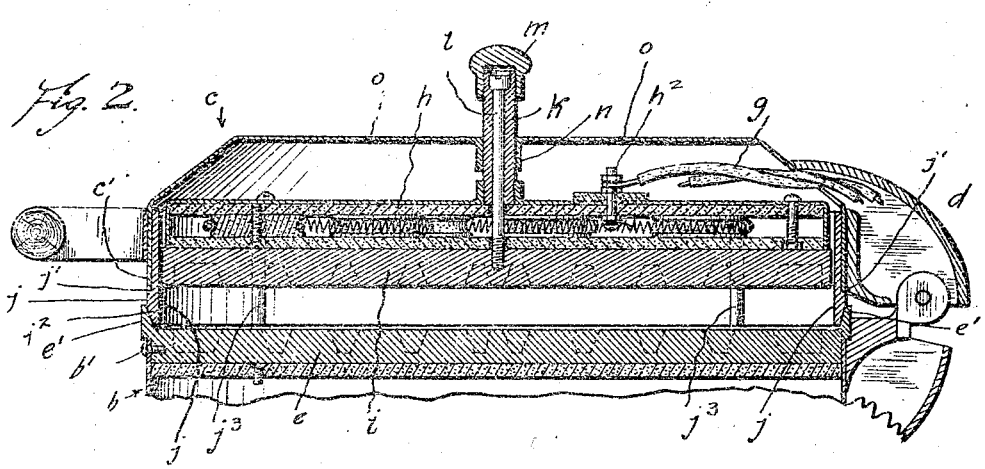
Inventor
Austin J. Neylon
By Geisler & Ramsey
Attorneys Feb. 8, 1927.
A. J. NEYLON
1,617,026
WAFFLE IRON
Filed Jan. 28, 1925   2 Sheets-Sheet 2

Inventor
Austin J. Neylon
By Heisler & Ramsey
Attorneys

Patented Feb. 8, 1927.

1,617,026

UNITED STATES PATENT OFFICE.

AUSTIN J. NEYLON, OF PORTLAND, OREGON.

WAFFLE IRON.

Application filed January 28, 1925. Serial No. 5,298.

My invention relates to waffle irons and the like, and especially to those that are electrically heated.

My invention has for its particular object the arrangement of the cooking surfaces or plates so as to permit the article being cooked to raise under but little restraint, thus inducing a fluffy, light article of food instead of one more or less heavy, as would be apt to result if the companion cooking surfaces were held in non-yielding contact with each other.

Another object of my invention is to provide means whereby the space between said companion cooking surfaces will be enclosed at all times, notwithstanding a recession of one of said surfaces from the other.

The purpose of such construction is twofold: It prevents any excess of unbaked dough from running out over the sides of the waffle-iron; it also serves to confine the heat and steam generated thereby, between the opposed cooking surfaces, thus tends to promote the cooking process.

Another object of my invention, when embodying in an electric waffle-iron, is to affix heating elements to the movable one of said cooking surfaces so as to maintain direct, constant contact therewith.

I attain my objects by making the particular cooking-plate contained in one of the body-sections of my waffle-iron slidable on an axis normal to the plane of said cookingplate; and in conection with such construction I preferably provide means for holding said slidable cooking-plate against rotating in its body-section, thus to insure the matching of the configurations on said slidable cooking-plate with the corresponding configurations on the fixed cooking-plate carried by the companion body section.

The confining of the heat and steam between the opposed cooking surfaces of my waffle-iron, I attain by providing the companion body-sections of the latter with cooperating rim flanges respectively.

Other features of my invention and the preferred constructions and operations of the parts whereby I attain the objects of my invention above specified, are hereinafter fully set forth with reference to the accompanying drawings.

In the latter:

Fig. 1, is a section taken along the vertical center line of the device and shows the normal arrangement of the griddle plates;

Fig. 2 is a similar section showing the griddle plates spread apart in the position they would assume if they are spaced by the expansion of the article being cooked;

My invention is shown as embodied in a waffle-iron mounted upon a base $a$. Said iron is composed of two half-body sections, a lower half $b$ and an upper half $c$, which are connected together by a hinge $d$. Said lower section $b$ is relatively stationary and is fastened to said base by bolts $a'$. Said lower half $b$ carries the fixed griddle-plate element $e$ and the heating element $f$ therefor. The lower half-section is formed cupshaped, as shown in Fig. 1, and the mouth of said section is uppermost and is covered by the griddle element $e$. Said griddle element is held in said fixed half by screws $b'$.

Figure 3:
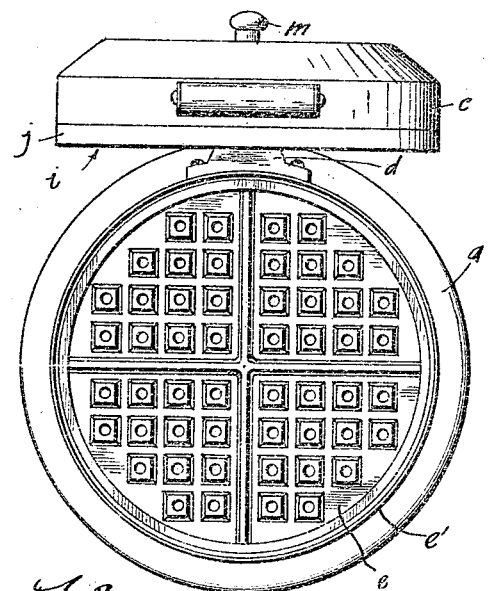
Fig. 3 is a plan view of a waffle-iron in opened position.
Figure 5:
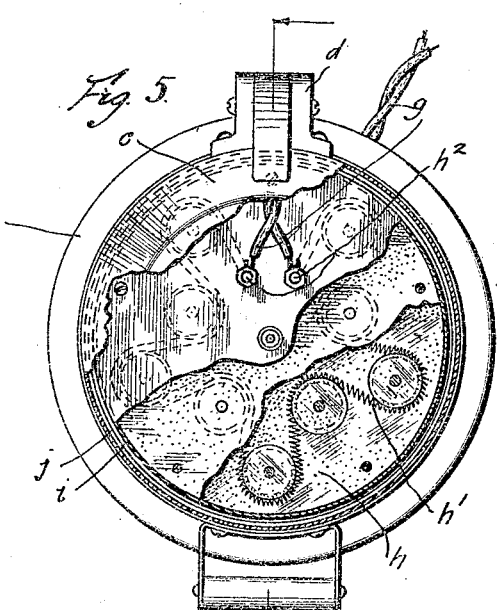
Fig. 5 is a plan view of the upper portion of the waffle-iron with the successive layers broken away to show details of construction thereof.
Figure 4:
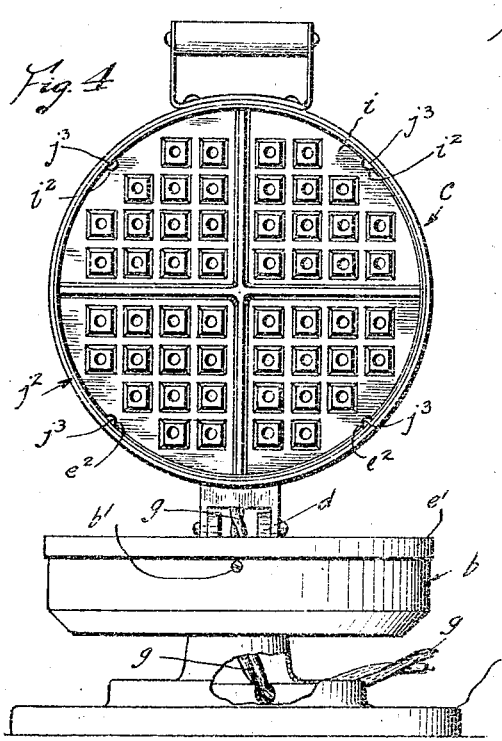
Fig. 4 is an elevation of said iron in open position with a portion broken away to show the electrical connections.
Figure 6:
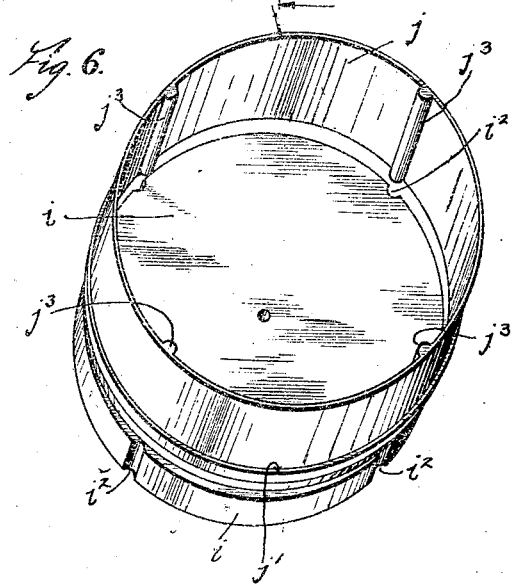
Fig. 6 is a perspective view of the upper griddle element with its guide and support frame shown super-impressed above it.

The heating element $f$ is located directly below said griddle element in direct contact therewith. Said heating element is provided with heating coils $f'$ and electrical conduits $g$ are fastened to the connections $f^2$ for said heating coils. Said electrical conduits also heat the upper heating element $h$, which has heating coils $h'$. The connections $h^2$ for said heating coils are fastened to the ends of said electrical conduit $g$. Said electrical conduit passes from the lower half to the upper half through the hinge section $d$, as shown in Figs. 1 and 4.

The upper heating element $h$ is carried directly upon the upper griddle element $i$. Said upper griddle element is slidably carried in a ring-like support $j$, which in turn is carried in the upper half $c$. The upper half-body section of said waffle-iron is also cup-shaped, but its mouth is arranged downwardly and the upper griddle element covers said mouth.

The ring-like support $j$ has a shoulder $j'$ thereon which engages the rim $c'$ of said upper half, as shown in Fig. 1. The rim of said ring-like support which faces the lower griddle arrangement is bevelled at $j^2$, as shown in Fig. 1, and laps and seats within the ring-like upstanding flange $e'$ upon the lower griddle element $e$, as shown in Figs. 1 and 2.

The upper griddle element is not fixed to said ring-like support $j$, but co-operating tongue and grooves $j^3$ and $i^2$ on the support $j$ and the upper griddle element $i$ respectively, tend to prevent the upper griddle element from turning relatively in the frame. Said ring-like support is arranged to be held against rotation in said upper half $c$. Said ring-like support is fixed in the upper half-section and preferably is held in place by fitting said ring snugly within said upper half, so as to eliminate the necessity for auxiliary holding devices.

A hollow tubular section $k$ is carried concentrically upon the heating element $h$, as shown in Fig. 1, and a holding-down bolt $l$ extends therethrough and is fitted into the upper heating element $e$. The head on said holding-down bolt $l$ tends to prevent longitudinal play between the tubular section $k$ and said bolt $l$ and thus holds the heating element and said upper griddle element against relative movement. The upper end of said tubular section $k$ is also threaded and a cap $m$ is mounted thereon which normally raises against the upper half of the waffle-iron when the griddle element is arranged in its normal position relatively to the lower griddle element.

Said tubular section $k$ is permitted to slide in the bore formed in said upper half of the waffle-iron by the downturned flange $n$. Vent holes $o$ are provided in said upper half to permit the steam, generated by the action of the heated griddle plates upon the unbaked dough, to escape. The steam passes from between said plates $e$ and $i$, around the slidable plate $i$ and its heating element $e$ and out through the holes $o$. Said holes also permit the air to enter and be exhausted from within the said upper waffle-iron section.

By mounting the griddle elements in the manner hereinbefore described they are quickly and easily attached and detached in said half-sections and flat, hot plates can be easily and quickly substituted therefor, for cooking hot-cakes or broiled steaks and the like.

To remove the lower griddle element it is necessary merely to back out the screws $b'$ and the griddle element can thus be lifted from the fixed lower half of the waffle-iron without affecting the heating element. Similarly the upper griddle element can be removed by unscrewing the holding-down bolt $l$ after said cap $m$ has been unscrewed.

As can thus be seen when waffles are to be made in the device which I have shown, the waffle-iron is opened up as is common and the dough is placed between said griddle elements. When said elements are closed the overlapping lips $j^2$ and $e'$ prevent the excess fluid dough from being forced out from said waffle-iron, as is a common fault in all irons with which I am familiar. In other words, in my device, when an excess amount of dough is placed in my waffle-iron it is not permitted to escape when said waffle is being formed and is expanding because the overlapping lips are never removed from co-operative relationship, instead of spreading the griddle elements apart at the parting line, so as to permit said dough to escape.

In my invention, said upper or movable griddle element moves upwardly and the lips remain in sealing position. By permitting the waffle to expand normally instead of compressing the same, a more fluffy, airy, product is produced. The expanding waffle has merely to lift the upper heating element and griddle element which moves up much easier as is evident than would be the case if the expanding dough would be required to lift the entire top half of the waffle iron. This is especially true because the dough is not permitted to escape.

As is obvious, my improved waffle-iron could be used for broiling steak and other articles besides cooking waffles and the like.

I claim:

1. In a waffle iron and the like of the character described comprising two companion, opposed cooking-surfaces, and an openable housing therefor, one of said cooking-surfaces being movable in one section of said housing on an axis in a plane which is normal to that of said cooking-surfaces thereby to permit the spacing of the opposed cooking-surfaces to be varied within said housing.

2. A waffle iron and the like comprising two separable companion body-sections, opposed cooking-plates housed in said body-sections respectively, one of said cooking plates being movable in its body section on an axis in a plane which is normal to that of its cooking-surface, thereby permitting the spacing of the opposed cooking-surfaces of said cooking-plates to be varied without separating said body sections from each other.

3. In a waffle-iron and the like comprising two companion body-sections, a cooking-plate contained in one of said body-sections, slidable relatively in said section on an axis normal to the plane of said cooking-plate and means on said latter body section preventing the rotation of said cooking-plate about said axis.

4. In a waffle-iron and the like comprising two companion body-sections, a cooking-plate contained in one of said body-sections and slidable on an axis normal to the plane of said cooking-plate, and the body-section containing said slidable cooking-plate and the latter being respectively provided with cooperating rib and groove elements preventing the rotation of said cooking-plate about said axis.

5. In a waffle-iron and the like comprising two companion body-sections, and one of said body-sections, being hollow, a cooking-plate housed in said section and provided with a perpendicular stem projecting from its interior face, said body-section being provided with a flanged guide-orifice in which said stem slides.

6. In a waffle-iron and the like comprising two companion body-sections, a cooking-plate contained in one of said body-sections and slidable relatively to and within said body section on an axis normal to the plane of said cooking-plate, and a heating element carried by said cooking-plate.

7. In a waffle-iron and the like comprising two companion body-sections, a cooking-plate removably contained in each of said sections, the cooking-plate contained in one of said body-sections being slidable relatively to its body section on an axis normal to the plane of said cooking-plate.

8. In a waffle iron and the like, two companion body sections, opposed cooking plates housed in said body sections respectively, co-operating rim flanges on said body sections enclosing the sides of the opposed cooking surfaces of said plates, one of said cooking plates being movable in its body section on an axis in a plane which is normal to that of its cooking surface, thereby permitting the spacing of the opposed cooking surfaces of said cooking plates to be varied without unseating said rim flanges, and co-operating guiding means on said slidably mounted cooking plate and its body section adapted to permit said variance in spacing but restraining the lateral displacement of said movable cooking plate.

9. In a waffle iron and the like, two companion body sections, opposed cooking plates housed in said body sections respectively, said body sections provided with co-operating rim flanges enclosing the sides of the opposed cooking surfaces of said cooking plates, and one of said plates being movable in its body section on an axis in a plane which is normal to that of its cooking surface, thereby permitting the spacing of the oposed cooking surfaces of said cooking plates to be varied without unseating said rim flanges.

AUSTIN J. NEYLON.